April 15, 1952

L. E. NIELSEN 2,593,389

RECORDING TORSION PENDULUM

Filed Dec. 2, 1950

INVENTOR.
Lawrence E. Nielsen
BY
Robert M. Dickey
ATTORNEY

Patented Apr. 15, 1952

2,593,389

UNITED STATES PATENT OFFICE 2,593,389

RECORDING TORSION PENDULUM

Lawrence E. Nielsen, Springfield, Mass., assignor to Monsanto Chemical Company, St. Louis, Mo., a corporation of Delaware Application December 2, 1950, Serial No. 198,819

3 Claims. (Cl. 73—99)

This invention relates to a torsion pendulum apparatus for determining dynamic shear modulus and damping of various materials. More particularly, the invention relates to an improved apparatus which is adapted to automatically record damped vibrations from which the dynamic shear modulus and damping of various materials can be calculated.

It is important for designers and engineers to know accurately the physical properties of the various materials with which they work. Among the more important of these are dynamic shear modulus and damping. The modulus is a measure of the deformation brought about by a sinusoidally varying shearing force while the damping gives an indication of the dissipation of energy into heat by such a deformation in the material.

To determine the dynamic shear modulus and the damping of a material, there is often used a torsion pendulum which comprises a moment-of-inertia disc suspended between two fixed points and having provision for insertion of the material test piece in the suspension means. The test is made by turning the moment-of-inertia disc a known amount and then observing the angle of the oscillations of the disc and the rate at which they die out. The data is obtained by reading a scale printed on the disc in conjunction with a fixed arm or pointer.

Prior apparatus has been useful but the accuracy and reproducibility of results depends largely on the individual who records the readings on the scale. As a result, the data obtained are frequently only a rough approximation of the true values.

One object of this invention is to provide a torsion pendulum adapted to automatically record damped vibrations from which the dynamic shear modulus and the damping of materials tested therein may be calculated.

A further object is to provide an improved torsion pendulum testing apparatus which will provide continuous measurements which are not subject to human errors of observation.

Figure 1:
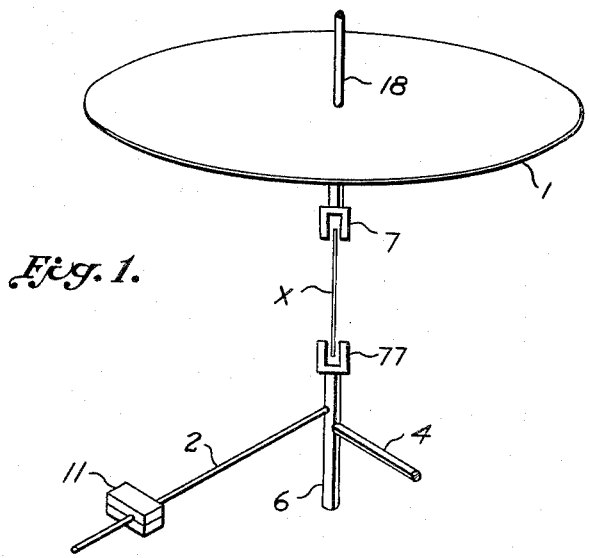
Figure 2:
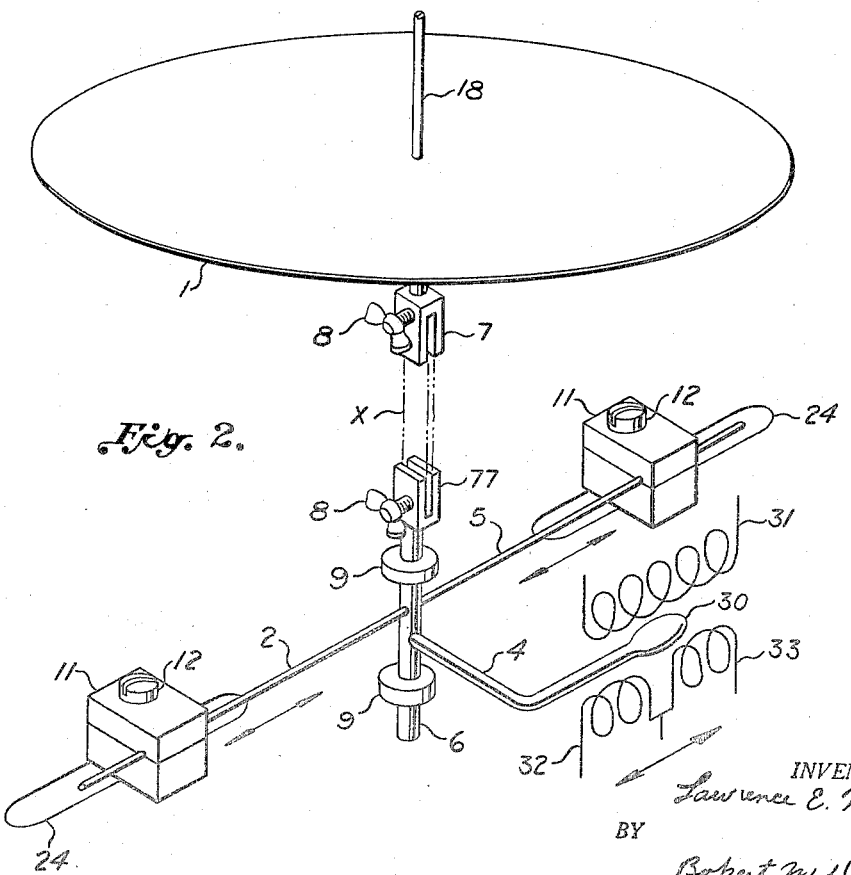

These and other objects are attained by modifying the conventional torsion pendulum testing apparatus, as will be more particularly set forth and described in connection with the accompanying drawings in which Figure 1 is a diagrammatic view of the improved torsion pendulum and Figure 2 is a perspective view in elevation of one embodiment of the invention.

Referring to the drawings, a wire 18 of known torque resistance is fixedly attached to moment-of-inertia disc 1 and thence to specimen holding means 7. A second specimen holding means 77 is positioned vertically under the first specimen holding means and is fixedly attached to a shaft 6 which extends downward from the holding means. A spring rod 2 is attached to shaft 6 in a direction perpendicular to the long axis of said shaft. The free end of rod 2 is attached to clamp 11. An indicating rod 4 is attached to shaft 6 in a direction perpendicular to the long axis of the shaft. The free end of the indicating rod cooperates in the direction of the arrow with suitable means, as shown, for instance, in Figure 2, for automatically indicating and/or recording the movement of the indicating rod.

In the operation of the apparatus, a sample or specimen of standardized dimensions is inserted in holding means 7 and 77 which may be clamps or other conventional means for fixedly positioning the sample in the testing apparatus. The moment-of-inertia disc 1 is then manually turned through an arbitrary arc which may, for example, be from 30 to 90 degrees, thereby putting wire 18 under torsion. The disc is then released and is free to oscillate in a pattern controlled by the wire 18 and the dynamic shear modulus and damping of the sample. The oscillations of the disc 1 are transmitted through the sample to shaft 6 which in turn transmits them to indicating rod 4. The magnitude of the movement of indicating means 4 is greatly reduced by the tension on shaft 6 supplied by spring rod 2, said tension damping or restricting the oscillation of shaft 6.

The size of spring rod 2 and the distance at which clamp 11 is positioned in relation to shaft 6 is determined by the type of material being tested. Thus, if the specimen is hard and stiff, clamp 11 is moved closer to shaft 6 and a relatively heavy spring rod may be used. Conversely, a soft and elastic material will require a smaller diameter spring rod and a greater distance between clamp 11 and the shaft.

The automatically recording means which cooperate with indicating means 4 may be of any of the various well-known types of mechanical and electrical recording apparatus. For example, a pencil or stylus may be attached directly to the end of indicating rod 4 with the marking end of the pencil or stylus bearing on a moving chart, in which case indicating means 4 should be fairly long. Other recording means such as a Wheatstone bridge, or a system of Selsyn motors, cooperating with an oscillograph or a system which includes a mirror, a beam of light and photographic recording means, etc. may be arranged to cooperate with indicating rod 4 to automatically record the damped vibrations or oscillations of the moment-of-inertia disc. From the recorded oscillations, it is a simple matter to calculate the dynamic shear modulus and the damping of the test specimen using well-known equations.

In a preferred specific embodiment of this invention shown in Figure 2, shaft 6 carries two frictionless bearings 9 which cooperate with a suitable rigid housing, not shown, to prevent all motion other than the desired oscillation of the shaft 6. A second spring rod 5 is attached to shaft 6 in a position diametrically opposite to the first spring rod 2 and is held in position by another adjustable clamp 11. Clamps 11 may be moved back and forth in the direction of the shaft 6 in channels 24. The clamps may be fastened in any desired positions in channels 24 by means of set screws 12. The free end of indicating rod 4 forms a horizontal right angle with that portion of rod 4 adjacent shaft 6. The iron core 30 of a linear variable differential transformer is fixedly attached to the free end of indicating rod 4. The primary coil 31 and the secondary coils 32 and 33 of a linear variable differential transformer are located around core 30 so that the linear movement of core 30 in response to the oscillation of shaft 6 transmits electrical impulses of varying intensity to automatic recording apparatus, not shown.

In the operation of the embodiment of this invention shown in Figure 2, the specimen is clamped firmly into specimen holders 7 and 77 by means of wing bolts 8. The spring rods 2 and 5 are chosen with regard to the known bending resistance thereof and the general characteristics of the test specimen, so that clamps 11 may be adjusted to reduce the oscillation of shaft 6 to approximately 0.1 degree of arc for a 30 degree oscillation of the moment-of-inertia disc 1. Since the oscillation frequency of shaft 6 is identical with that of the moment-of-inertia disc and since the transformer may be easily modulated by conventional means to the same frequency, the variation in output voltage of the transformer caused by the linear movement of the iron core with respect to the two secondary coils of the transformer, is directly proportional to the torque on the lower specimen clamp 77. By transmitting the voltage variation to a recording oscillograph, a true and accurate recording of the oscillations of the moment-of-inertia disc 1 is obtained.

In the operation of the apparatus of this invention, the size and number of spring rods and the position of the clamp or clamps thereon is varied according to the materials being tested. For many materials, a single spring rod is all that is necessary. For other materials, it may be necessary to use two spring rods which may be of the same or different diameter. The spring rod may be permanently attached to the shaft if only one kind of material is to be tested. Otherwise, means such as set screws are used to hold the rod in place on the shaft.

As in conventional torsion pendulum apparatus, wire 18 may be fixedly attached to a support, not shown, or it may be passed over a pulley and the free end weighted to counterbalance the weight of the moment-of-inertia disc, clamps, specimen, etc.

The apparatus of this invention makes it possible to obtain a complete, accurate and continuous recording of the oscillations of the moment-of-inertia disc in a torsion pendulum testing apparatus from which recording the dynamic shear modulus and the damping effect of the test specimens may be calculated with hitherto impossible accuracy. Variations due to human factors such as errors due to parallax are eliminated and a continuous record impossible for a human observer to make is obtained.

It is obvious that variations may be made in the apparatus of this invention without departing from the spirit and scope thereof as defined in the appended claims.

What is claimed is:

1. In a torsion pendulum apparatus for testing dynamic shear modulus and damping, said apparatus including a wire of known torque resistance fixedly attached to a moment-of-inertia disc, a specimen holding means fixedly attached to said disc, a second specimen holding means positioned vertically under said first specimen holding means, and a shaft supporting said second specimen holding means and extending vertically thereunder, the improvement which comprises at least one spring rod attached to said shaft in a direction perpendicular to the long axis of the shaft, adjustable clamping means on the spring rod, an indicating rod fixedly attached to said shaft in a direction perpendicular to the long axis of said shaft, and means cooperating with said indicating rod to automatically record the movement thereof in response to oscillations of the moment-of-inertia disc transmitted to said indicating rod through the specimen and said shaft.

2. In a torsion pendulum apparatus for testing dynamic shear modulus and damping, said apparatus including a wire of known torque resistance fixedly attached to a moment-of-inertia disc, a specimen holding means fixedly attached to said disc, a second specimen holding means positioned vertically under said first specimen holding means, and a shaft supporting said second specimen holding means and extending vertically thereunder, the improvement which comprises two spring rods attached to said shaft on opposite sides thereof and in a direction perpendicular to the long axis thereof, adjustable clamping means on each spring rod, an indicating rod fixedly attached to said shaft in a direction perpendicular to the long axis of said shaft, and means cooperating with said indicating rod to automatically record the movement thereof in response to the oscillations of the moment-of-inertia disc transmitted to said indicating rod through the specimen and said shaft.

3. In a torsion pendulum apparatus for testing dynamic shear modulus and damping, said apparatus including a wire of known torque resistance fixedly attached to a moment-of-inertia disc, a specimen holding means fixedly attached to said disc, a second specimen holding means positioned vertically under said first specimen holding means, and a shaft supporting said second specimen holding means, and extending vertically thereunder, the improvement which comprises at least one spring rod demountably attached to said shaft in a direction perpendicular to the long axis of the shaft, adjustable clamping means on the spring rod, an indicating rod with one of its ends fixedly attached to said shaft in a direction perpendicular to the long axis of the shaft and the free end of the rod forming a horizontal right angle with the fixed end, an iron core of a linear variable differential transformer fixedly attached to the free end of said indicating rod, coils of a linear variably differential transformer located in operative position around said core, and automatic recording means cooperating with said transformer to record variation in voltage output of the transformer caused by the movement of the core within the coils of the transformer in response to oscillations of the moment-of-inertia disc transmitted to said core through the specimen, the shaft and the indicating rod.

LAWRENCE E. NIELSEN.

REFERENCES CITED

The following references are of record in the file of this patent:

UNITED STATES PATENTS

| Number | Name | Date |
|---|---|---|
| 1,608,174 | Heymann | Nov. 23, 1926 |
| 1,831,320 | Pertz | Nov. 10, 1931 |

FOREIGN PATENTS

| Number | Country | Date |
|---|---|---|
| 430,597 | Germany | June 21, 1926 |
| 649,213 | Germany | Aug. 18, 1937 |